(12) United States Patent
Tsai et al.

(10) Patent No.: US 8,090,110 B2
(45) Date of Patent: Jan. 3, 2012

(54) METHOD AND APPARATUS FOR DETERMINING SOUND STANDARD FOR INPUT SOUND SIGNAL

(75) Inventors: Tien-Ju Tsai, Sinshih Township, Tainan County (TW); Shih-Chuan Lu, Sinshih Township, Tainan County (TW); Shu-Ming Liu, Sinshih Township, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 926 days.

(21) Appl. No.: 12/081,745

(22) Filed: Apr. 21, 2008

(65) Prior Publication Data
US 2009/0262246 A1  Oct. 22, 2009

(51) Int. Cl.
*H04R 29/00* (2006.01)
(52) U.S. Cl. ............................... 381/56; 381/58; 700/94
(58) Field of Classification Search .............. 381/3, 56, 381/58; 700/94
See application file for complete search history.

(56) References Cited

U.S. PATENT DOCUMENTS
2005/0244015 A1 * 11/2005 Sung .............................. 381/58

FOREIGN PATENT DOCUMENTS
EP        2023623 A2 *  2/2009
* cited by examiner

*Primary Examiner* — Minh-Loan T Tran
(74) *Attorney, Agent, or Firm* — Rabin & Berdo, P.C.

(57) ABSTRACT

A method for determining a sound standard for an input sound signal includes the following steps. Firstly, the input sound signal is filtered to obtain a first filtered signal corresponding to a first frequency and a second filtered signal corresponding to a second frequency. Next, the first filtered signal is frequency-demodulated to obtain a first demodulated filtered signal, and whether the input sound signal contains a FM analog component corresponding to the first frequency is determined accordingly. Next, the second filtered signal is decoded according to a digital sound standard to obtain a bit stream. Then, the bit steam is interpreted according to the digital sound standard, and whether the input sound contains a digital component corresponding to the digital sound standard is determined accordingly. Then, whether the input sound signal matches one of known sound standards is determined based on the determined results above.

15 Claims, 10 Drawing Sheets

METHOD AND APPARATUS FOR DETERMINING SOUND STANDARD FOR INPUT SOUND SIGNAL

BACKGROUND OF THE INVENTION

1. Field of the Invention

The invention relates in general to a method and an apparatus for determining a sound standard of a television system, and more particularly to a sound standard detecting method and an apparatus thereof capable of correctly and rapidly detecting a sound standard for an input sound signal.

2. Description of the Related Art

A current analog-modulated television system (e.g., a receiver) has to firstly determine an unknown sound standard for an input sound signal. This mechanism operates when a demodulator of the television system is initialized to provide the information for setting the demodulator. In order to prevent the normal operation of the receiver from being influenced, a sound standard determining method has to correctly and rapidly detect the sound standard for the input sound signal.

A conventional sound standard detecting method is performed in a try and error manner to detect carrier frequencies corresponding to possibly matched sound standards for the input sound signal. However, the conventional sound standard determining method is quite time-consuming and cannot satisfy the requirement of rapidly detecting the sound standard. In addition, the conventional sound standard determining method cannot correctly determine a portion of the sound standards. So, how to provide a sound standard detecting method capable of correctly and rapidly detecting the sound standard for the input sound signal is a target to be reached in the industry.

SUMMARY OF THE INVENTION

A sound standard determining method includes the following steps. First, an input sound signal is filtered to obtain a first filtered signal corresponding to a first frequency. Next, the first filtered signal is frequency-demodulated to obtain a first demodulated filtered signal, and whether the input sound signal has a frequency modulation (FM) analog component corresponding to the first frequency is determined according to a phase change of the first demodulated filtered signal. Thereafter, the input sound signal is filtered to obtain a second filtered signal corresponding to a second frequency. Then, the second filtered signal is decoded according to a digital sound standard to obtain a bit stream. Next, the bit stream is interpreted according to the digital sound standard, and whether the processed bit stream is successfully interpreted is determined to determine whether the input sound signal has a digital component corresponding to the digital sound standard. Then, whether the input sound signal matches one of several known sound standards is determined according to determined results obtained in the above-mentioned steps.

A sound standard determining apparatus including a filter, a frequency demodulator, a decoder, an interpreting unit and a sound standard determining unit is provided. The filter filters an input sound signal to obtain a first filtered signal corresponding to a first frequency, and filters the input sound signal to obtain a second filtered signal corresponding to a second frequency. The frequency demodulator frequency-demodulates the first filtered signal to obtain a first demodulated filtered signal, and determines whether the input sound signal has a FM analog component corresponding to the first frequency according to a phase change of the first demodulated filtered signal. The decoder decodes the second filtered signal according to a digital sound standard to obtain a bit stream. The interpreting unit interprets the bit stream according to the digital sound standard, and determines whether the processed bit stream is successfully interpreted to determine whether the input sound signal has a digital component corresponding to the digital sound standard. The sound standard determining unit determines whether the input sound signal matches one of several known sound standards according to determined results of the frequency demodulator and the interpreting unit.

The invention will become apparent from the following detailed description of the preferred but non-limiting embodiments. The following description is made with reference to the accompanying drawings.

DETAILED DESCRIPTION OF THE INVENTION

Figure 1:
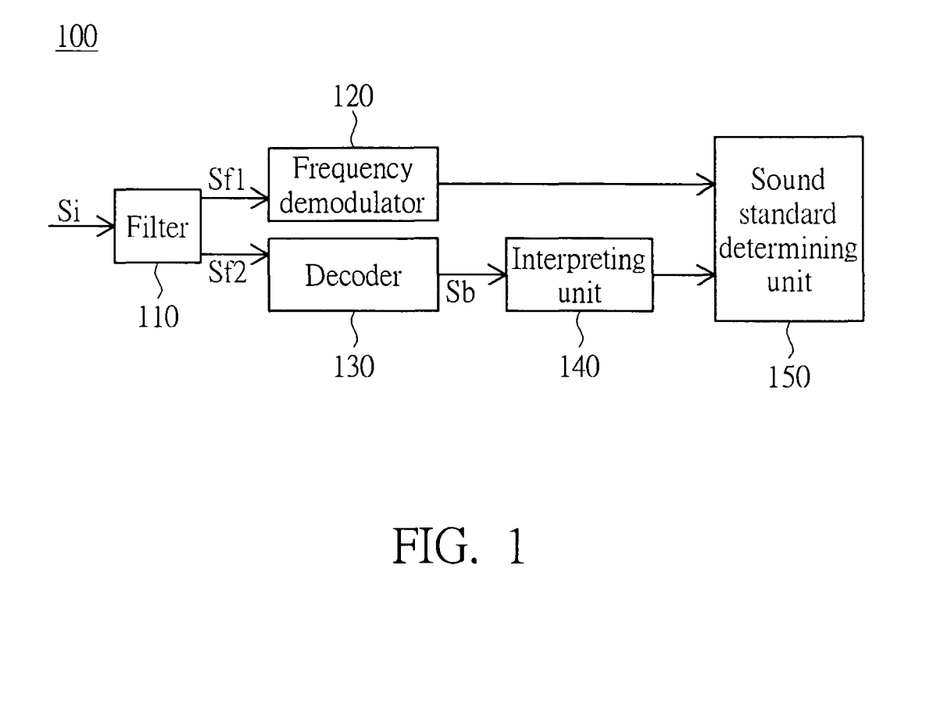
FIG. 1 is a block diagram showing a sound standard determining apparatus 100 according to an embodiment of the invention.
Figure 2:
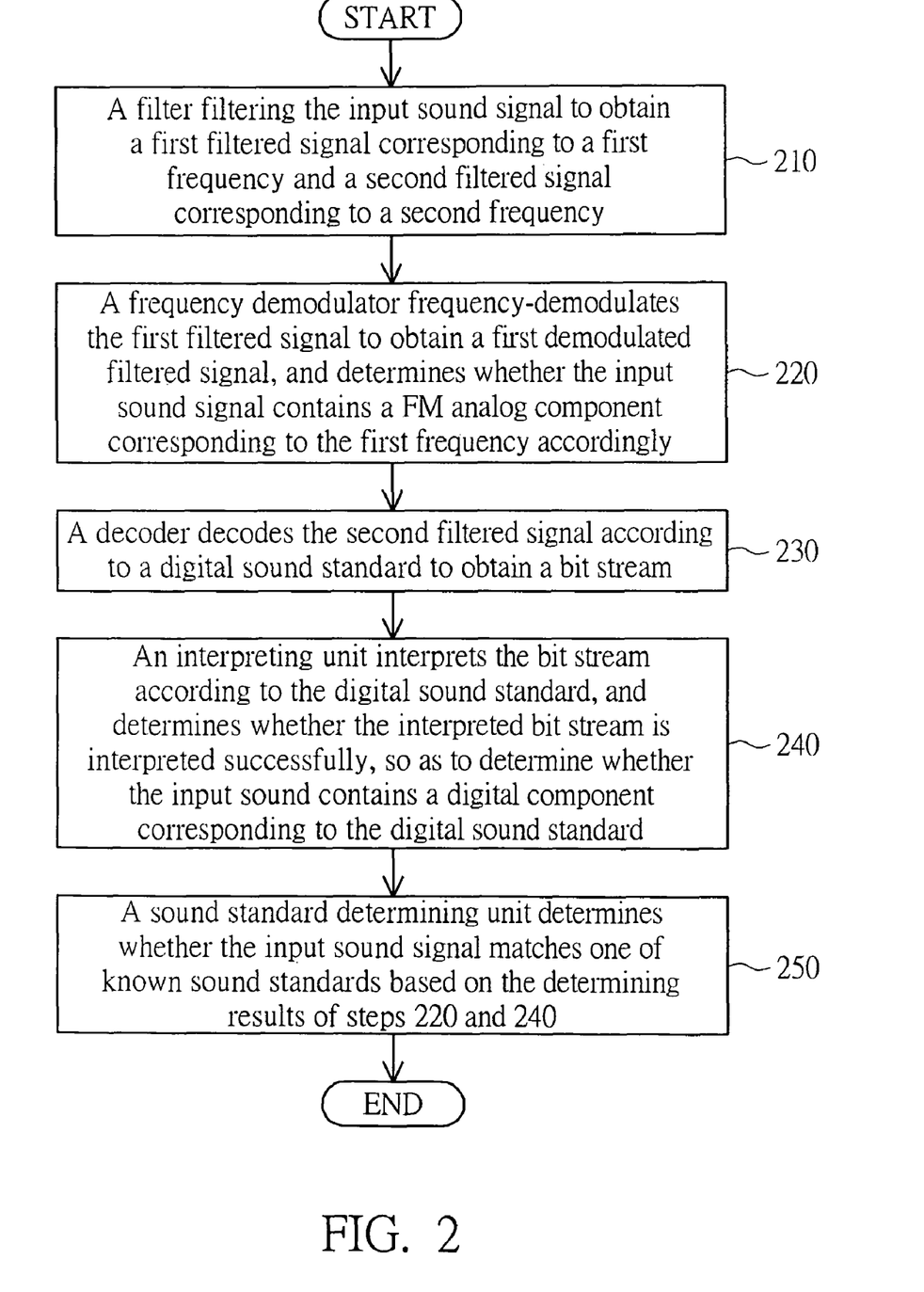
FIG. 2 is a flow chart showing a sound standard determining method according to the embodiment of the invention.

FIG. 1 is a block diagram showing a sound standard determining apparatus 100 according to an embodiment of the invention. Referring to FIG. 1, the sound standard determining apparatus 100 includes a filter 110, a frequency demodulator 120, a decoder 130, an interpreting unit 140 and a sound standard determining unit 150. FIG. 2 is a flow chart of a sound standard determining method according to the embodiment of the invention. The sound standard determining method of FIG. 2 is applied to the sound standard determining apparatus of FIG. 1 to determine a sound standard for an input sound signal.

Illustrations will be made with reference to FIGS. 1 and 2. First, in step 210, the filter 110 filters an input sound signal Si to obtain a first filtered signal Sf1 corresponding to a first frequency F1 and a second filtered signal Sf2 corresponding to a second frequency F2. Next, in step 220, the frequency demodulator 120 frequency-demodulates the first filtered signal Sf1 to obtain a first demodulated filtered signal Sf1' (not shown), and determines whether the input sound signal Si has a frequency modulation (FM) analog component corresponding to the first frequency according to a phase change of the first demodulated filtered signal Sf1'. Thereafter, in step 230, the decoder 130 decodes the second filtered signal Sf2 according to a digital sound standard Sd to obtain a bit stream Sb. Then, in step 230, the interpreting unit 140 interprets the bit stream Sb according to the digital sound standard, and determines whether the interpreted bit stream Sb is successfully interpreted to determine whether the input sound signal Si has a digital component corresponding to the digital sound standard Sd. Thereafter, in step 240, the sound standard determining unit 150 determines whether the input sound signal Si matches one of known sound standards according to determined results obtained in the steps 220 and 240.

Each known sound standard may contain the FM analog component corresponding to a specific frequency, such as the first frequency F1, and the digital component corresponding to a certain specific digital sound standard Sd. The digital component of the sound signal matching the specific digital sound standard Sd is carried by the corresponding carrier corresponding to the second frequency F2. Thus, the sound standard determining method of this embodiment can determine whether the input sound signal matches a certain specific known sound standard by determining whether the input sound signal has the FM analog component corresponding to the specific frequency and whether the input sound signal has a specific digital component.

Figure 3:
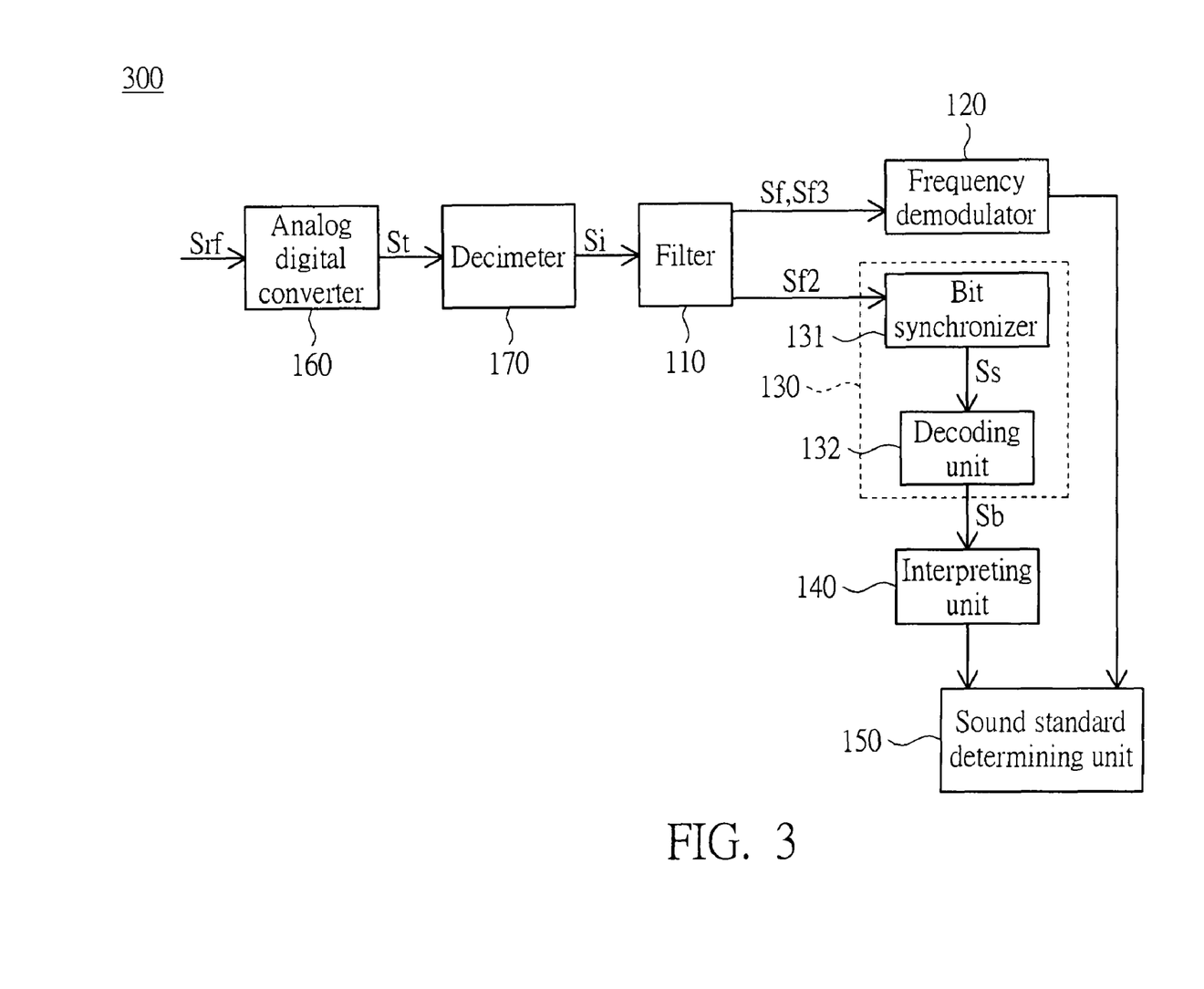
FIG. 3 is a block diagram showing a sound standard determining apparatus 300 according to the other embodiment of the invention.

FIG. 3 is a block diagram showing a sound standard determining apparatus 300 according to the other embodiment of the invention. What is different from the sound standard determining apparatus 100 of FIG. 1 is that the sound standard determining apparatus 300 further includes an analog digital converter 160 and a decimator 170, and the decoder 130 thereof further includes a bit synchronizer 131 and a decoding unit 132. The sound standard determining apparatus 300 may be used in a wireless receiver, such as a television system.

Figure 4A:
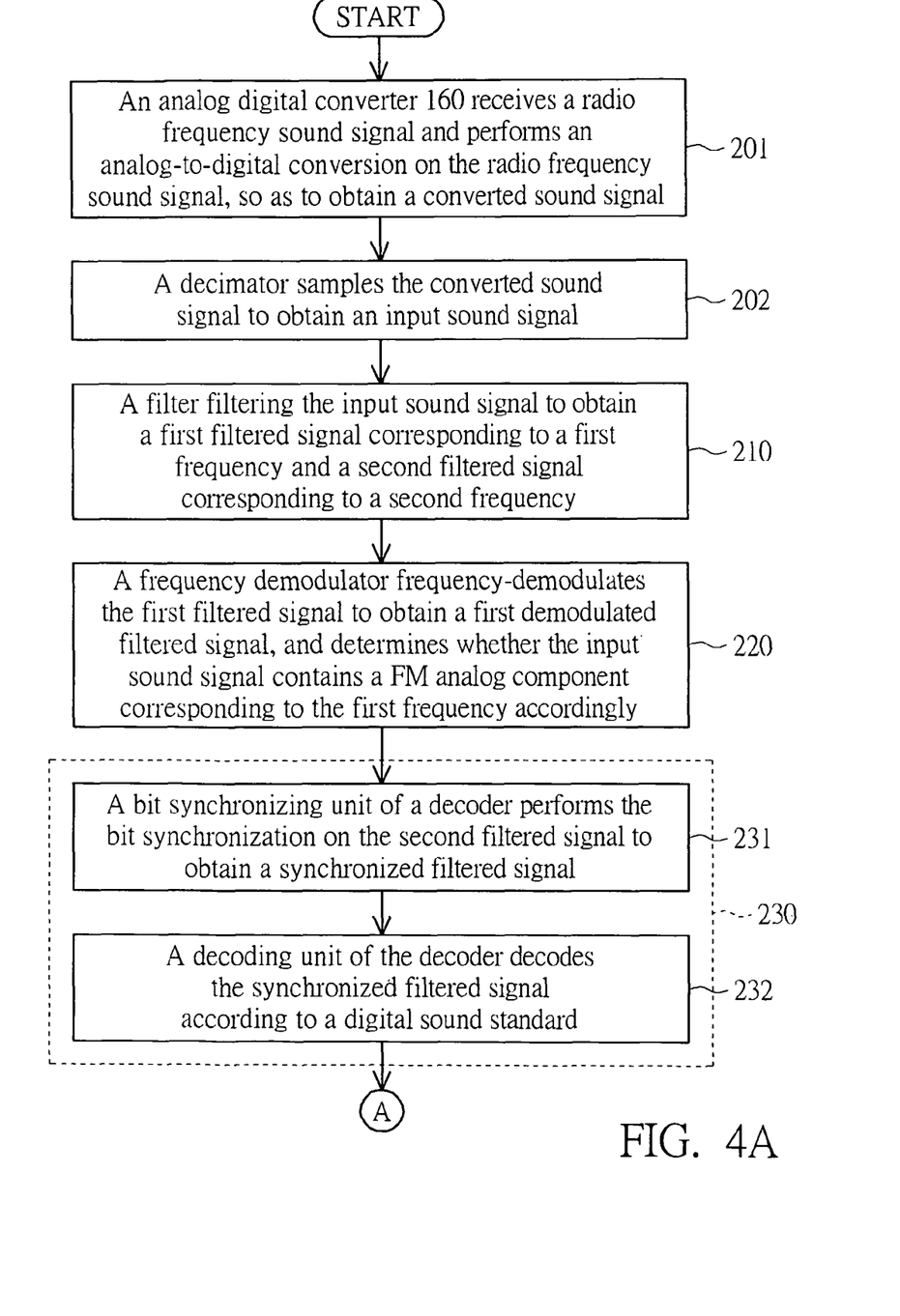
FIG. 4A and FIG. 4B show a flow chart showing a sound standard determining method according to the other embodiment of the invention.
Figure 4B:
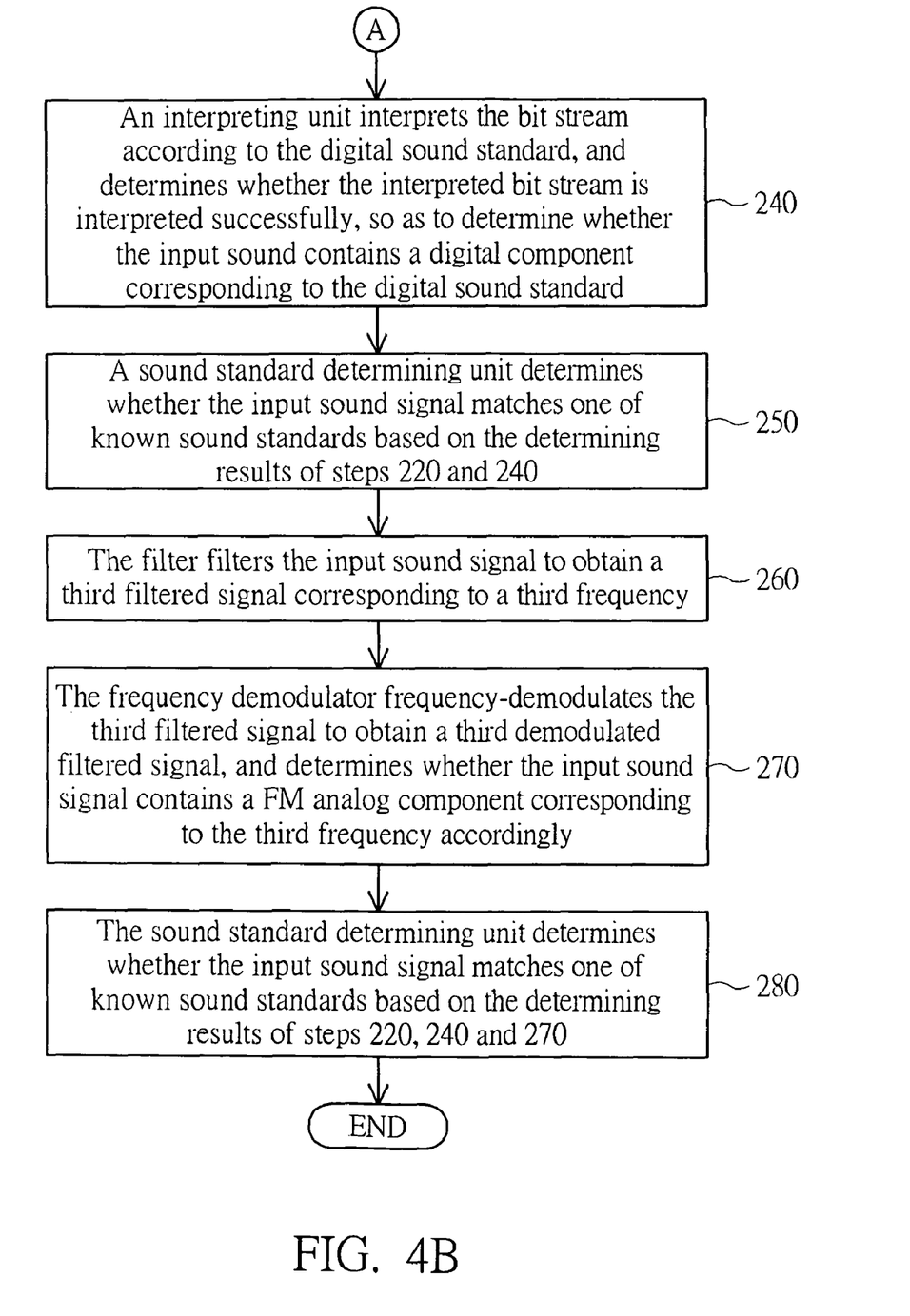

FIG. 4A and FIG. 4B show a flow chart showing a sound standard determining method according to the other embodiment of the invention. The method is applied to the sound standard determining apparatus 300 to receive a radio frequency sound signal Srf and determine whether the sound standard for the input sound signal Si corresponding to the radio frequency sound signal Srf matches one of several known sound standards.

What is different from FIG. 2 is that the method of FIG. 4A and FIG. 4B further includes, before the step 210, steps 201 and 202 for processing the radio frequency sound signal Srf to obtain the input sound signal Si. In addition, the step 230 includes steps 231 and 232 and the method further includes, after the step 240, steps 250 to 280.

Illustrations will be made with reference to FIGS. 3, 4A and 4B. In the step 201, the analog digital converter 160 receives the radio frequency sound signal Srf, and analog-to-digital converts the radio frequency sound signal Srf to obtain a converted sound signal St. Next, in the step 202, the decimator 170 samples the converted sound signal St to obtain the input sound signal Si. Similarly, in the step 210, the input sound signal Si is filtered to obtain the first filtered signal Sf1 corresponding to the first frequency F1 and the second filtered signal Sf2 corresponding to the second frequency F2.

Next, in the step 220, the first filtered signal Sf1 is frequency-demodulated to obtain the first demodulated filtered signal Sf1', and then the frequency demodulator 120 determines whether the input sound signal Si has the FM analog component corresponding to the first frequency F1. When the input sound signal Si has the FM analog component corresponding to a specific filtered frequency, the phase change of the demodulated filtered signal corresponding to this filtered frequency typically will not exceed a default range. In this case, the phase change exceeds the default range by the number of times, which is smaller than a threshold value. Therefore, if the number of times that the phase change of the first demodulated filtered signal Sf1' exceeds the default range is smaller than the threshold value, it represents that the first demodulated filtered signal Sf1' is correctly demodulated. At this time, the frequency demodulator 120 determines that the input sound signal Si has the FM analog component corresponding to the first frequency F1.

On the contrary, if the input sound signal Si does not have the FM analog component corresponding to the filtered frequency, the phase of the demodulated filtered signal corresponding to the filtered frequency is changed irregularly, and frequently exceeds the default range. In this case, the number of times that the phase change exceeds the default range is not smaller than the threshold value. Thus, the frequency demodulator 120 determines that the input sound signal Si does not have the FM analog component corresponding to the first frequency F1.

Then, in the step 230, the decoder 130 decodes a second filtered signal Sf2. First, in the step 231 of the step 230, the bit synchronizer 131 of the decoder 130 bit-synchronizes the second filtered signal Sf2 to obtain a synchronized filtered signal Ss. The bit-synchronizing operation is the symbol timing recovery. Next, in the step 232 of the step 230, the decoding unit 132 of the decoder 130 decodes the synchronized filtered signal Ss according to the digital sound standard Sd to obtain the bit stream Sb. Then the method proceeds to the node A in the FIG. 4A.

Then please refer to FIG. 4B. After proceeding to the node A, in the step 240, the interpreting unit 140 interprets the bit stream Sb according to the digital sound standard Sd, and determines whether the interpreted bit stream Sb has been successfully interpreted. The interpreting unit 140 determines whether the interpreted bit stream Sb is interpreted into several signal frames corresponding to the digital sound standard Sd. If the bit stream Sb can be correctly interpreted into several signal frames, the interpreting unit 140 determines that the input sound signal Si has the digital component corresponding to the digital sound standard Sd. On the contrary, the interpreting unit 140 can determine that the input sound signal Si does not have the digital component corresponding to the digital sound standard Sd.

Thereafter, in the step 250, the sound standard determining unit 150 determines whether the input sound signal Si matches one of several sound standards according to whether the input sound signal Si has the FM analog component corresponding to the first frequency F1 and has the digital component corresponding to the digital sound standard Sd.

Next, in the step 260, the filter 110 again filters the input sound signal Si to obtain a third filtered signal Sf3 corresponding to a third frequency F3.

Thereafter, in the step 270, the frequency demodulator 120 frequency-demodulates the third filtered signal Sf3 to obtain a third demodulated filtered signal Sf3' (not shown), and determines whether the input sound signal Si has the FM analog component corresponding to the third frequency F3 according to the phase change of the third demodulated filtered signal Sf3'. Similarly, if the phase change of the third demodulated filtered signal Sf3' exceeds the default range by the number of times, which is smaller than the threshold value, the input sound signal Si has the FM analog component corresponding to the third frequency F3. On the contrary, the input sound signal Si does not have the FM analog component corresponding to the third frequency F3.

Next, in the step 280, the sound standard determining unit 150 determines whether the input sound signal Si matches one of the known sound standards according to the determined results obtained in the steps 220, 240 and 270.

The sound standard determining method of this embodiment will be illustrated in the following. In this example, the known sound standards include NICAM-DK, NICAM-L, NICAM-I, NICAM-BG, A2-DK1, A2-DK2, A2-DK3, A2-BG, FM Radio, EIA-J, BTSC (Broadcast Television Systems Committee) and Korea standards, and will be described in the following.

The digital sound standard Sd of this example is the NICAM (Near Instantaneous Companded Audio Multiplex) standard. Each of the input sound signals matching the NICAM-DK, NICAM-L, NICAM-I and NICAM-BG standards includes the NICAM digital component. The digital components of the sound signals matching the NICAM-DK, NICAM-L and NICAM-BG standards are carried by the carrier corresponding to the frequency of 5.85 MHz. The digital component of the sound signal matching the NICAM-I standard is carried by the carrier corresponding to the frequency of 6.552 MHz.

On the other hand, the input sound signals matching the A2-DK1, A2-DK2, A2-DK3, A2-BG, FM Radio, EIA-J, BTSC and Korea standards do not have the NICAM digital component. The A2-DK1, A2-DK2, A2-DK3 and A2-BG standards respectively have FM analog components corresponding to two specific frequencies. That is, the FM analog components of the A2-DK1, A2-DK2, A2-DK3 and A2-BG standards are respectively carried by two carriers with different frequencies.

Each of the NICAM-L, NICAM-DK, A2-DK1, A2-DK2 and A2-DK3 standards has the FM analog component corresponding to 6.5 MHz, that is, uses the carrier of 6.5 MHz. The A2-DK1, A2-DK2 and A2-DK3 standards additionally and respectively use the carriers of 6.257813 MHz, 6.7421875 MHz and 5.7421875 MHz. That is, the input sound signals matching the A2-DK1, A2-DK2 and A2-DK3 standards additionally have the FM analog components respectively corresponding to the above-mentioned filtered frequencies. The NICAM-L standard has an amplitude modulated analog component.

On the other hand, the A2-BG and NICAM-BG standards have the FM analog components corresponding to 5.5 MHz, and the A2-BG standard further has the FM analog component corresponding to 5.7421875 MHz.

The EIA-J, BTSC and Korea standards have the FM analog components corresponding to 4.5 MHz. In addition, the Korea standard further has the FM analog component corresponding to 4.724212 MHz in an enhanced mode. The sound standard determining method of this embodiment has to be performed in conjunction with the manually setting method in order to determine the input sound signals Si matching the NICAM-L, EIA-J, BTSC and Korea standards.

FIG. 5A to FIG. 5E show a flow chart of the sound standard determining method of determining the input sound signal Si as one of the NICAM-DK, NICAM-L, NICAM-I, NICAM-BG, A2-DK1, A2-DK2, A2-DK3, A2-BG, FM Radio, EIA-J, BTSC and Korea standards in conjunction with the manual setting according to this embodiment of the invention. The sound standard determining method in FIG. 5A to FIG. 5E is applied to the sound standard determining apparatus 300.

Figure 5A:
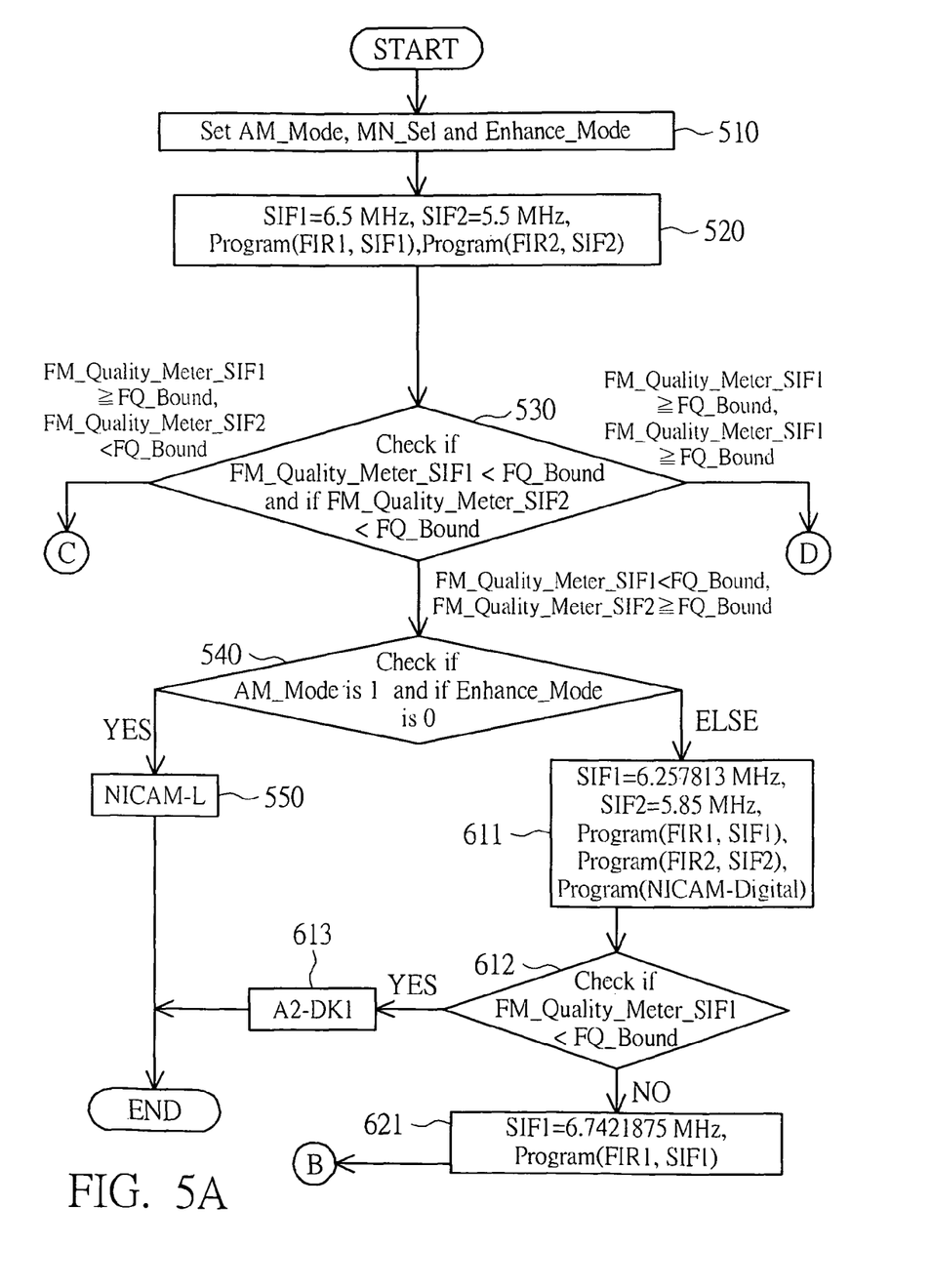
FIG. 5A to FIG. 5E illustrate a flow chart showing the sound standard determining method of determining an input sound signal Si as one of NICAM-DK, NICAM-L, NICAM-I, NICAM-BG, A2-DK1, A2-DK2, A2-DK3, A2-BG, FM Radio, EIA-J, BTSC and Korea standards in conjunction with the manual setting according to this embodiment of the invention.

Please refer to FIG. 5A. First, in step 510, three parameters AM_Mode, MN_Sel and Enhance_Mode are set manually. If it is known that the sound standards which may be matched with the input sound signal Si include the NICAM-L standard, then AM_Mode is set as 1. If it is known that the sound standards which may be matched with the input sound signal Si do not include the NICAM-L standard, then AM_Mode is set as 0.

If it is known that the input sound signal Si may be in the enhanced mode, Enhance_Mode is set as 1. On the contrary, Enhance_Mode is set as 0.

MN_Sel is a two-bit binary selecting parameter. If it is known that the sound standards which may be matched with the input sound signal Si include the EIA-J standard, MN_Sel is set as 10. If it is known that the sound standards which may be matched with the input sound signal Si include the BTSC standard, MN_Sel is set as 01. If it is known that the sound standards which may be matched with the input sound signal Si include the Korea standard and the input sound signal Si is not in the enhanced mode, MN_Sel is set as 00. If it is known that the input sound signal Si does not match any one of the EIA-J, BTSC and Korea standards, MN_Sel is set as 11.

Next, in step 520, the filter 110 executes Program(FIR1, SIF1) and Program(FIR2,SIF2). In the step 520, the filter 110 sets a filtered frequency SIF1 as 6.5 MHz and sets a filtered frequency SIF2 as 5.5 MHz. The Program(FIR1,SIF1) represents the operation of filtering the input sound signal Si according to the filtered frequency SIF1 to obtain the filtered signal corresponding to the filtered frequency SIF1. Similarly, the Program(FIR2,SIF2) represents the operation of filtering the input sound signal Si according to the frequency SIF2 to obtain the filtered signal corresponding to the filtered frequency SIF2.

In the step 520, SIF1 and SIF2 are respectively set as 6.5 MHz and 5.5 MHz. Thus, the filter 110 obtains the filtered signal corresponding to 6.5 MHz and the filtered signal corresponding to 5.5 MHz.

Next, in step 530, the frequency demodulator 120 frequency-demodulates the two filtered signals, counts the number of times that the phase change of the demodulated filtered signal corresponding to the filtered frequency SIF1 exceeds a default range, and counts the number of times that the phase change of the demodulated filtered signal corresponding to the filtered frequency SIF2 exceeds the default range. The numbers of times are respectively represented by FM_Quality_Meter_SIF1 and FM_Quality_Meter_SIF2. In the step 530, the frequency demodulator 120 determines whether FM_Quality_Meter_SIF1 and FM_Quality_Meter_SIF2 are smaller than a threshold value FQ_Bound.

If FM_Quality_Meter_SIF1 is smaller than FQ_Bound and FM_Quality_Meter_SIF2 is not smaller than FQ_Bound, it represents that the input sound signal Si has the FM analog component corresponding to 6.5 MHz and does not have the FM analog component corresponding to 5.5 MHz. The sound standard determining unit 150 determines that the input sound signal Si does not match the NICAM-I, NICAM-BG, A2-BG, FM Radio, EIA-J, BTSC and Korea standards, and can match one of NICAM-L, NICAM-DK, A2-DK1, A2-DK2 and A2-DK3 standards.

Next, the method continues to step 540 to further screen the sound standard of the input sound signal Si.

In the step 540, the sound standard determining unit 150 determines whether AM_Mode is equal to 1 and determines whether Enhance_Mode is equal to 0. If AM_Mode is 1 and Enhance_Mode is 0, this method proceeds to step 550, and the sound standard determining unit 150 determines that the input sound signal Si matches the NICAM-L standard. Because FM_Quality_Meter_SIF1 and FM_Quality_Meter_SIF2 of the input sound signal having the amplitude modulated component are always smaller than the threshold value FQ_Bound, using FM_Quality_Meter_SIF1 and FM_Quality_Meter_SIF2 cannot obtain whether the input sound signal Si has the amplitude modulated component. Therefore, the sound standard determining method of this embodiment has to cooperate with the manually setting method to detect the input sound signal Si matching the NICAM-L standard. In the step 540, the input sound signal Si may match one of the NICAM-L, NICAM-DK, A2-DK1, A2-DK2 and A2-DK3 standards. In this case, if AM_Mode is 1 and Enhance_Mode is 0, it represents that the input sound signal Si matches the NICAM-L standard with the amplitude modulated analog component.

Oppositely, if AM_Mode is 0 or Enhance_Mode is 1, the method proceeds to step 611. In the step 611, the filter 110 executes Program(FIR1,SIF1) and Program(FIR2,SIF2), wherein the filtered frequency SIF1 is 6.257813 MHz and the filtered frequency SIF2 is 5.85 MHz.

In addition, the decoder 130 and the interpreting unit 140 execute Program(NICAM-Digital) according to the filtered frequency corresponding to 5.85 MHz in the step 611. Program(NICAM-Digital) represents the operations of decoding and interpreting the NICAM standard. That is, the decoder 130 firstly decodes the filtered signal with the filtered frequency corresponding to 5.85 MHz to obtain the bit stream Sb. Next, the interpreting unit 140 further interprets the bit stream Sb into several signal frames according to the NICAM standard. The interpreting unit 140 also determines whether the bit stream Sb is successfully interpreted to obtain a parameter NICAM_Frame_Lock. If the bit stream Sb can be correctly interpreted into several signal frames, it represents that the input sound signal Si has the digital component matching the NICAM standard, and the interpreting unit 140 outputs NICAM_Frame_Lock as 1. On the contrary, the interpreting unit 140 outputs NICAM_Frame_Lock as 0.

Next, in step 612, the frequency demodulator 120 obtains FM_Quality_Meter_SIF1 corresponding to the filtered frequency of 6.257813 MHz, and determines whether it is smaller than the threshold value FQ_Bound. If yes, it represents that the input sound signal Si has the FM analog component corresponding to 6.257183 MHz. In addition, the input sound signal Si also has the FM analog component corresponding to 6.5 MHz, and the property that the A2-DK1 standard simultaneously has the FM analog components corresponding to 6.5 MHz and 6.257183 MHz is satisfied. Therefore, the method proceeds to step 613, and the sound standard determining unit 150 decides the input sound signal Si matches the A2-DK1 standard. If not, it represents that the input sound signal does not match the A2-DK1 standard but may match one of the NICAM-L, NICAM-DK, A2-DK2 and A2-DK3 standards. Therefore, the method proceeds to step 621 to further screen the known sound standard of the input sound signal Si.

In the step 621, the filter 110 executes Program(FIR1, SIF1), wherein the filtered frequency SIF1 is 6.7421875 MHz. Then the method proceeds to the node B.

Figure 5B:
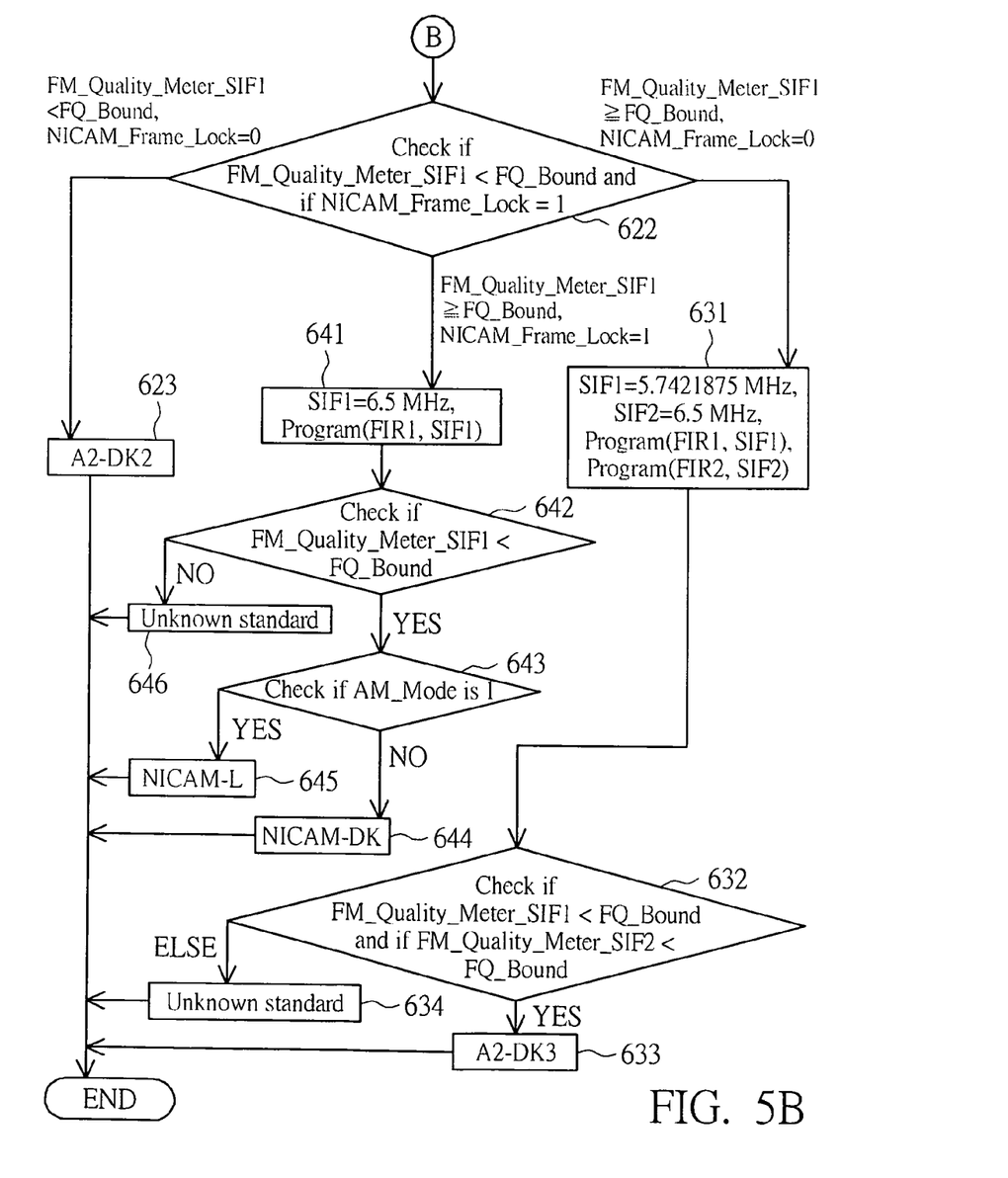

Please refer to FIG. 5B. After proceeding to the node B, in step 622, the frequency demodulator 120 obtains FM_Quality_Meter_SIF1 corresponding to the filtered frequency of 6.7421875 MHz, and determines whether it is smaller than the threshold value FQ_Bound. In addition, in the step 622, the sound standard determining unit 150 determines whether NICAM_Frame_Lock is 0 or not. If FM_Quality_Meter_SIF1 corresponding to the filtered frequency of 6.7421875 MHz is smaller than the threshold value FQ_Bound and NICAM_Frame_Lock is 0, it represents that the input sound signal Si has the FM analog component corresponding to 6.7421875 MHz but does not have the digital component corresponding to the NICAM standard. In addition, since the input sound signal Si also has the FM analog component corresponding to 6.5 MHz, the property that the A2-DK2 standard simultaneously has the FM analog components corresponding to 6.7421875 MHz and 6.5 MHz is satisfied. In this case, the method proceeds to step 623, and the sound standard determining unit 150 determines that the input sound signal Si matches the A2-DK2 standard.

On the other hand, if FM_Quality_Meter_SIF1 corresponding to the filtered frequency of 6.7421875 MHz is not smaller than the threshold value FQ_Bound and NICAM_Frame_Lock is 0, it represents that the input sound signal Si does not have the FM analog component corresponding to 6.7421875 MHz and also does not have the digital component corresponding to the NICAM standard. Therefore, the input sound signal Si does not match the A2-DK2, NICAM-DK and NICAM-L standards, but may match the A2-DK3 standard.

In order to determine whether the input sound signal Si matches the A2-DK3 standard, the method proceeds to step 631. In the step 631, the filter 110 executes Program(FIR1, SIF1) and Program(FIR2,SIF2), wherein the filtered frequency SIF1 is 5.7421875 MHz and the filtered frequency SIF2 is 6.5 MHz.

Next, in step 632, the frequency demodulator 120 determines whether FM_Quality_Meter_SIF1 corresponding to the filtered frequency of 5.7421875 MHz is smaller than the threshold value FQ_Bound and determines whether FM_Quality_Meter_SIF2 corresponding to the filtered frequency of 6.5 MHz is smaller than the threshold value FQ_Bound. If both are true, it represents that the input sound signal Si simultaneously has the FM analog components corresponding to 6.5 MHz and 5.7421875 MHz, and the property of the A2-DK3 standard is satisfied. Therefore, this method proceeds to step 633, and the sound standard determining unit 150 determines that the input sound signal Si matches the A2-DK3 standard. If the above condition is not satisfied, the method proceeds to step 634 and the input sound signal Si does not pertain to any known sound standard.

Going back to step 622, in which the method proceeds to step 641 if FM_Quality_Meter_SIF1 corresponding to the filtered frequency of 6.7421875 MHz is smaller than FQ_Bound and NICAM_Frame_Lock is 1. Because the NICAM_Frame_Lock of 1 represents that the input sound signal Si has the digital component matching the NICAM standard, the input sound signal Si may match the NICAM-L or NICAM-DK standard.

In the step 641, the filter 110 executes Program(FIR1, SIF1), wherein the filtered frequency SIF1 is 6.5 MHz. Next, in step 642, the frequency demodulator 120 determines whether FM_Quality Meter_SIF1 corresponding to the filtered frequency of 6.5 MHz is smaller than the threshold value FQ_Bound. If yes, it represents that the input sound signal Si may have the FM analog component corresponding to 6.5 MHz.

Then, the method proceeds to step 643, and the sound standard determining unit 150 determines whether AM_Mode is 1 or not. Since FM_Quality_Meter_SIF1 cannot be used to determine whether the input sound signal Si has the amplitude modulated analog component, so it is impossible to determine whether the input sound signal Si pertains to the NICAM-L or NICAM-DK standard. Therefore, in the step 643, if AM_Mode is 0, it represents that it is known that the input sound signal Si does not have the amplitude modulated analog component. Thus, the sound standard determining unit 150 verifies that the input sound signal Si has the FM analog component corresponding to 6.5 MHz. In addition, the input sound signal Si also has the digital component corresponding to the NICAM standard, and the property that the NICAM-DK standard simultaneously has the digital component corresponding to the NICAM standard and the FM analog component corresponding to 6.5 MHz is satisfied, so the method proceeds to step 644. In the step 644, the sound standard determining unit 150 determines that the input sound signal Si matches the NICAM-DK standard.

Oppositely, in the step 643, if AM_Mode is 1, it represents that it is known that the input sound signal Si has the amplitude modulated analog component. Because the input sound signal Si additionally has the digital component corresponding to the NICAM standard, the method proceeds to step 645, and the sound standard determining unit 150 determines that the input sound signal Si matches the NICAM-L standard.

In addition, in the step 642, if the frequency demodulator 120 determines that FM_Quality_Meter_SIF1 corresponding to 6.5 MHz is not smaller than the threshold value FQ_Bound, the method proceeds to step 646, and the sound standard determining unit 150 determines that the input sound signal Si does not match any known sound standard.

Going back to step 530 in FIG. 5A, if FM_Quality_Meter_SIF1 corresponding to the filtered frequency of 6.5 MHz is not smaller than FQ_Bound, and FM_Quality_Meter_SIF2 corresponding to the filtered frequency of 5.5 MHz is smaller than FQ_Bound, it represents that the input sound signal Si has the FM analog component corresponding to 5.5 MHz but does not have the FM analog component corresponding to 6.5 MHz. Therefore, the input sound signal Si may match the A2-BG or NICAM-BG standard, but does not match the other known sound standards. In this case, the method proceeds to the node C.

Figure 5C:
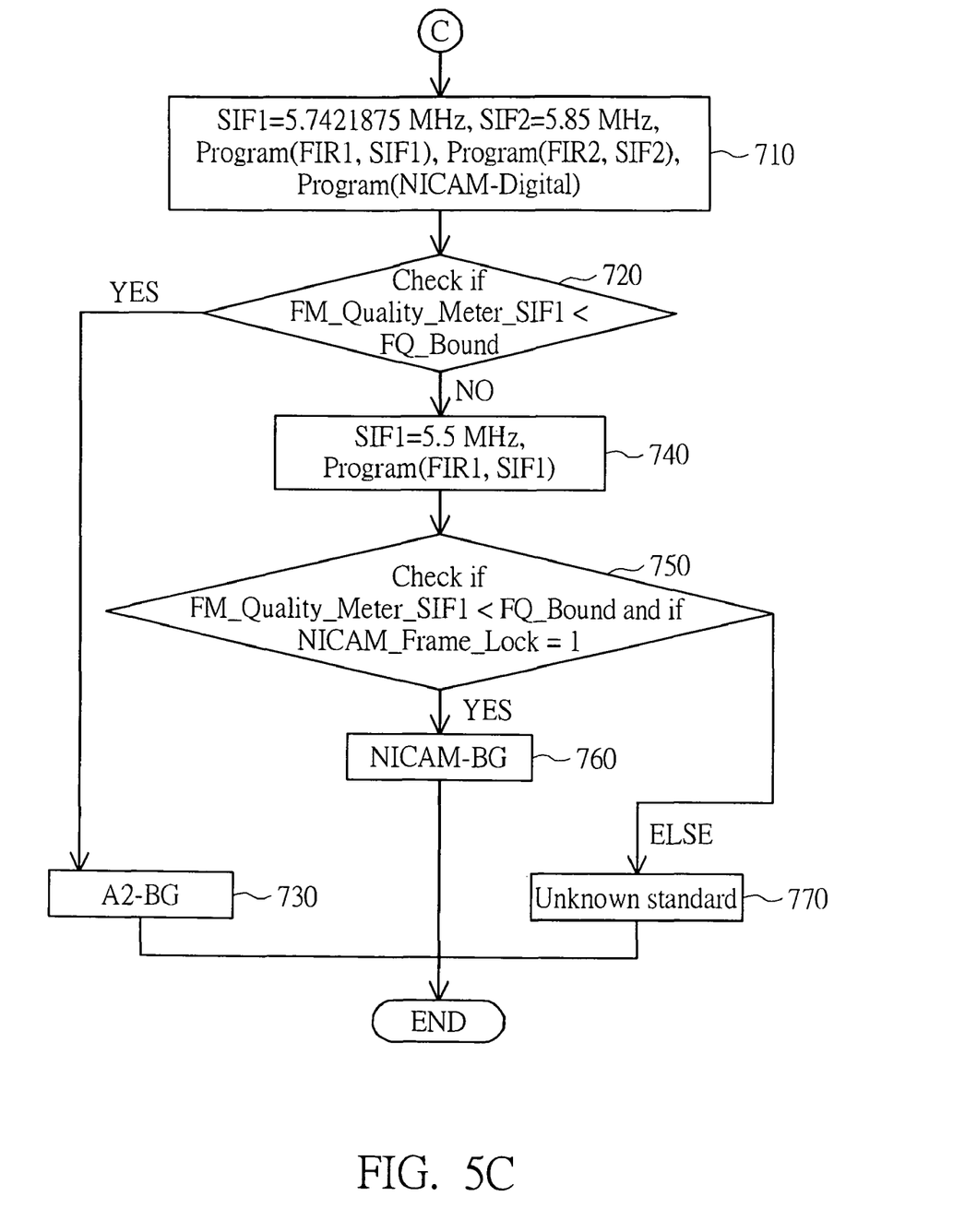

Please refer to FIG. 5C. After proceeding to the node C, the method proceeds to step 710, and the filter 110 executes Program(FIR1,SIF1) and Program(FIR2,SIF2). The filtered frequency SIF1 is 5.7421875 MHz, and the filtered frequency SIF2 is 5.85 MHz. In the step 710, the decoder 130 and the interpreting unit 140 execute Program(NICAM-Digital) on the filtered signal corresponding to the filtered frequency of 5.85 MHz to obtain the corresponding parameter NICAM_Frame_Lock.

Next, this method proceeds to step 720, and it is determined whether FM_Quality_Meter_SIF1 corresponding to the filtered frequency of 5.7421875 MHz is smaller than FQ_Bound. If FM_Quality_Meter_SIF1 corresponding to the filtered frequency of 5.7421875 MHz is smaller than FQ_Bound, it represents that the input sound signal Si has the frequency-demodulated analog component corresponding to 5.7421875 MHz. In addition, the input sound signal Si also has the frequency-demodulated analog component corresponding to 5.5 MHz, the property that the A2-BG standard simultaneously has the FM analog components corresponding to 5.7421875 MHz and 5.5 MHz is satisfied. So, this method proceeds to step 730, and the sound standard determining unit 150 determines that the input sound signal Si matches the A2-BG standard.

Oppositely, if FM_Quality_Meter_SIF1 corresponding to the filtered frequency of 5.7421875 MHz is smaller than FQ_Bound, it represents that the input sound signal Si does not match the A2-BG standard but may match the NICAM-BG standard.

In order to determine whether the input sound signal Si matches the NICAM-BG standard, this method proceeds to step 740. In the step 740, the filter 110 executes Program (FIR1,SIF1), wherein the filtered frequency SIF1 is 5.5 MHz. Next, in step 750, it is determined whether FM_Quality_Meter_SIF1 corresponding to the filtered frequency of 5.5 MHz is smaller than FQ_Bound and whether NICAM_Frame_Lock is equal to 1. If FM_Quality_Meter_SIF1 is smaller than FQ_Bound and NICAM_Frame_Lock is equal to 1, it represents that the input sound signal Si has the FM analog component corresponding to the filtered frequency of 5.5 MHz and the digital component matching the NICAM standard. Therefore, the method proceeds to step 760, and the sound standard determining unit 150 determines that the input sound signal Si matches the NICAM-BG standard.

If the above-mentioned condition is not matched, the method proceeds to step 770, and the sound standard determining unit 150 determines that the input sound signal Si does not match any one of the known sound standards.

Going back to the step 530 in FIG. 5A, if FM_Quality_Meter_SIF1 corresponding to the filtered frequency of 6.5 MHz is not smaller than FQ_Bound and FM_Quality_Meter_SIF2 corresponding to the filtered frequency of 5.5 MHz is also not smaller than FQ_Bound, it represents that the input sound signal Si does not have the FM analog components corresponding to 5.5 MHz and 6.5 MHz. Thus, the input sound signal Si does not match the NICAM-DK, NICAM-L, NICAM-BG, A2-DK1, A2-DK2, A2-DK3 and A2-BG standards, but may match the NICAM-I, FM Radio, EIA-J, BTSC and Korea standards. In order to screen the sound standard of the input sound signal Si, the method proceeds to the node D.

Figure 5D:
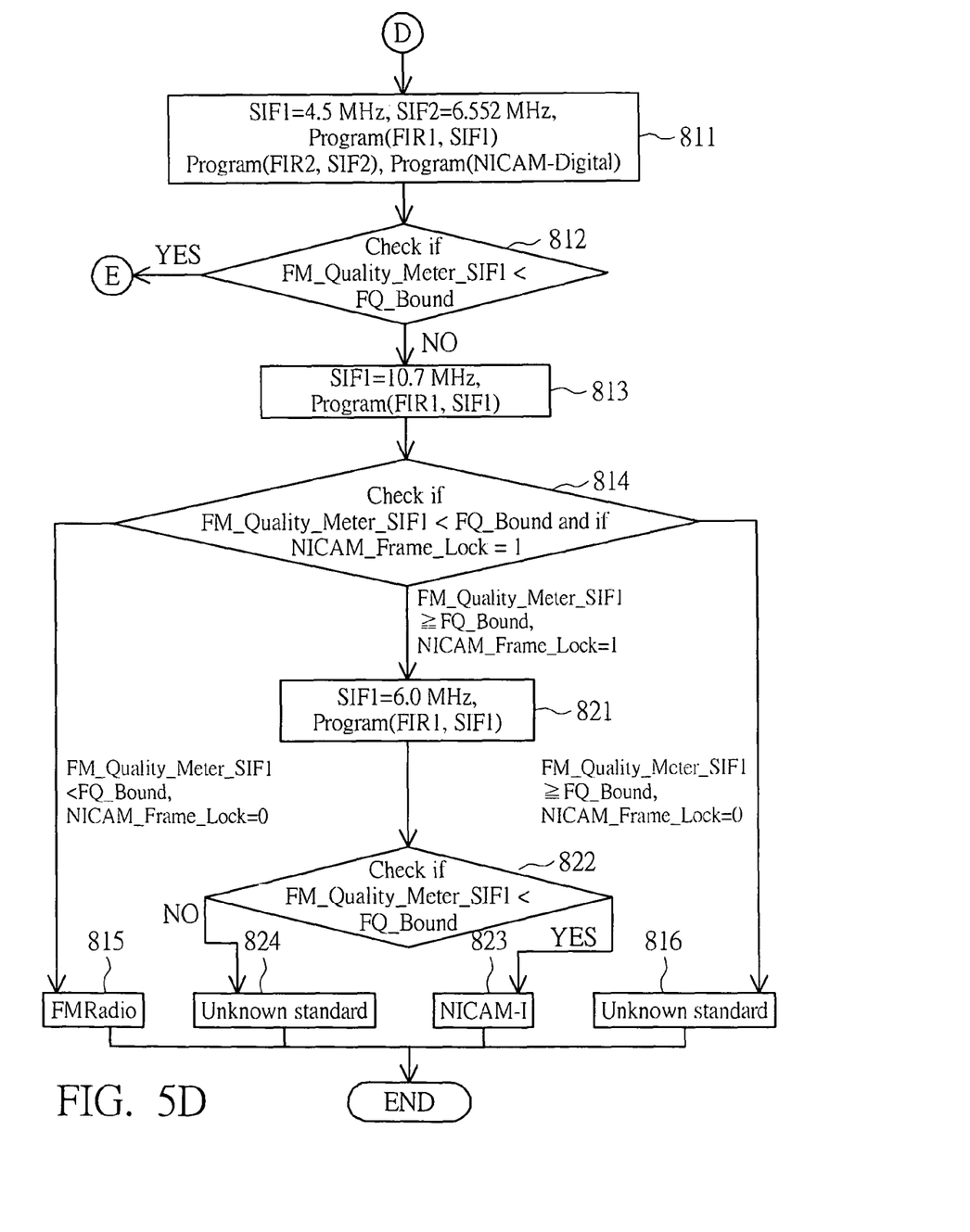

Please refer to FIG. 5D. After proceeding to the node D, in the step 811, the filter 110 executes Program(FIR1,SIF1) and Program(FIR2,SIF2) according to the input sound signal Si, wherein the filtered frequency SIF1 is 4.5 MHz and the filtered frequency SIF2 is 6.552 MHz. In addition, in the step 811, the decoder 130 and the interpreting unit 140 execute Program(NICAM-Digital) according to the filtered signal with the filtered frequency of 6.552 MHz and thus obtain NICAM_Frame_Lock.

Thereafter, in step 812, the frequency demodulator 120 determines whether FM_Quality_Meter_SIF1 corresponding to the filtered frequency of 4.5 MHz is smaller than the threshold value FQ_Bound or not. If not, it represents that the input sound signal Si does not have the FM analog component corresponding to the filtered frequency of 4.5 MHz. Therefore, the input sound signal Si does not match the EIA-J, BTSC and Korea standards but may match the NICAM-I and FM Radio standards.

Next, the method proceeds to step 813. In order to determine whether the input sound signal Si pertains to the FM Radio standard or not, the filter 110 executes Program(FIR1, SIF1) in the step 813, wherein the filtered frequency SIF1 is 10.7 MHz. Next, in step 814, it is determined whether FM_Quality_Meter_SIF1 corresponding to 10.7 MHz is smaller than the threshold value FQ_Bound or not and whether NICAM_Frame_Lock is 1 or not. If the FM_Quality_Meter_SIF1 corresponding to 10.7 MHz is smaller than the threshold value FQ_Bound and NICAM_Frame_Lock is 0, the method proceeds to step 815 to determine whether the input sound signal Si matches the FM Radio standard.

Oppositely, if FM_Quality_Meter_SIF1 corresponding to 10.7 MHz is not smaller than the threshold value FQ_Bound and NICAM_Frame_Lock is 1, it represents that the input sound signal Si does not match the FM Radio standard but may match the NICAM-I standard. Next, the method proceeds to step 821. In the step 821, the filter 110 executes Program(FIR1,SIF1), wherein the filtered frequency SIF1 is 6.0 MHz. Next, in step 822, it is determined whether FM_Quality_Meter_SIF1 corresponding to 6.0 MHz is smaller than the threshold value FQ_Bound or not. If FM_Quality_Meter_SIF1 corresponding to 6.0 MHz is smaller than the threshold value FQ_Bound, the method proceeds to step 823, and the sound standard determining unit 150 determines that the input sound signal Si matches the NICAM-I standard. On the contrary, the input sound signal Si does not match any known sound standard.

Going back to step 814, if FM_Quality_Meter_SIF1 is not smaller than 0, and the NICAM_Frame_Lock is 0, the method proceeds to step 816, in which the sound standard determining unit determines that the input sound signal Si does not match any of the known standards.

Going back to step 812, if FM_Quality_Meter corresponding to 4.5 MHz is smaller than the threshold value FQ_Bound, it represents that the input sound signal Si has the FM analog component corresponding to the filtered frequency of 4.5 MHz. Thus, the input sound signal Si may match the EIA-J, BTSC and Korea standards. In this case, the method proceeds to the node E.

Figure 5E:
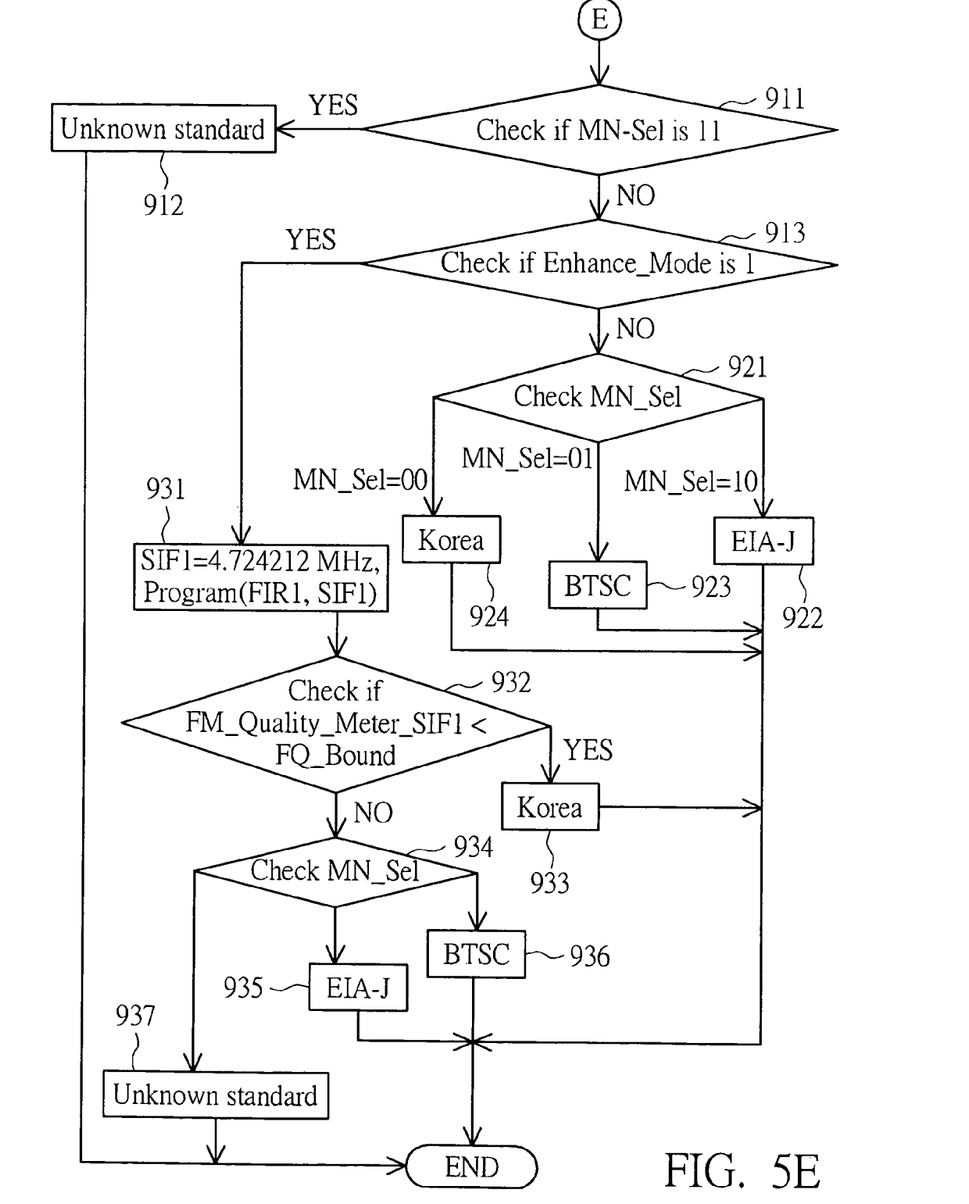

Please refer to FIG. 5E. After proceeding to the node E, in the step 911, the sound standard determining unit determines whether MN_Sel is 11 or not. If yes, it represents that the input sound signal Si does not match the EIA-J, BTSC and Korea standards. Consequently, the method proceeds to step 912, and the sound standard determining unit 150 determines that the input sound signal Si does not match any one of the known sound standards.

If MN_Sel is not 11, it represents that the input sound signal Si may match one of the EIA-J, BTSC and Korea standards, and the method proceeds to step 913. In the step 913, the sound standard determining unit 150 determines whether Enhance_Mode is 1. If Enhance_Mode is 0, it represents that the known input sound signal Si is not in the enhanced mode. Therefore, the method proceeds to step 921. In the step 921, the sound standard determining unit 150 determines the value of MN_Sel. If the value of MN_Sel is 10, the method proceeds to step 922 to determine that the input sound signal Si matches the EIA-J standard. If MN_Sel is 01, the method proceeds to step 923 to determine that the input sound signal Si matches the BTSC standard. If MN_Sel is 00, the method proceeds to step 924 to determine that the input sound signal Si matches the Korea standard.

Going back to step 913, if Enhance_Mode is 1, it represents that the input sound signal Si is in the enhanced mode and the method proceeds to step 931. In the step 931, the filter 110 executes Program(FIR1,SIF1) in order to determine whether the input sound signal Si matches the Korea standard in the enhanced mode, wherein SIF1 is 4.724212 MHz. Next, in step 932, it is determined whether FM_Quality_Meter_SIF1 corresponding to 4.724212 MHz is smaller than the threshold value FQ_Bound. If yes, it represents that the input sound signal Si has the FM analog component corresponding to 4.724212 MHz. In addition, the input sound signal Si also has the FM analog component corresponding to 4.5 MHz. Therefore, the input sound signal matches the property that the Korea standard in the enhanced mode simultaneously has the FM analog components corresponding to 4.5 MHz and 4.724212 MHz. Thus, the method proceeds to step 933 to determine that the input sound signal Si matches the Korea standard in this case.

Oppositely, if FM_Quality_Meter_SIF1 corresponding to 4.724212 MHz is not smaller than the threshold value FQ_Bound in the step 932, it represents that the input sound signal Si does not match the Korea standard. In this case, the method proceeds to step 934 to determine whether the input sound signal Si matches one of the BTSC and EIA-J standards. In this step 934, the sound standard determining unit 150 determines the value of MN_Sel. If MN_Sel is 10, this method proceeds to step 935, and the sound standard determining unit 150 determines whether the input sound signal Si matches the EIA-J standard. If MN_Sel is 01, this method proceeds to step 936, and the sound standard determining unit 150 determines that the input sound signal Si matches the BTSC standard.

As mentioned hereinabove, the sound standard determining method in this example according to the embodiment of the invention can automatically determine whether the input sound signal Si matches the NICAM-DK, NICAM-I, NICAM-BG, A2-DK1, A2-DK2, A2-DK3, A2-BG and FM Radio standards according to whether the input sound signal Si has the FM analog component corresponding to the specific frequency and the digital component corresponding to the NICAM standard.

In addition, the sound standard determining method according to the embodiment of the invention may further determine whether the input sound signal Si matches one of the NICAM-L, EIA-J, BTSC and Korea standards in conjunction with the procedures of manually setting AM_Mode, Enhance_Mode and MN_Sel, Therefore, the sound standard determining method according to the embodiment of the invention can systematically screen the known sound standard matched with the input sound signal from many known sound standards.

In this example, the known sound standards include the NICAM-DK, NICAM-L, NICAM-I, NICAM-BG, A2-DK1, A2-DK2, A2-DK3, A2-BG, FM Radio, EIA-J, BTSC and Korea standards, for example, and the digital sound standard is the NICAM standard, for example. In practice, however, the sound standard determining method according to the embodiment of the invention is not restricted to the method of determining the above-mentioned known sound standards.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for determining a sound standard for an input sound signal, the method comprising:
    filtering the input sound signal to obtain a first filtered signal corresponding to a first frequency and a second filtered signal corresponding to a second frequency;
    frequency-demodulating the first filtered signal to obtain a first demodulated filtered signal, and determining whether the input sound signal contains a FM (frequency modulation) analog component corresponding to the first frequency according to a phase change of the first demodulated filtered signal;
    decoding the second filtered signal according to a digital sound standard to obtain a bit stream;
    interpreting the bit stream according to the digital sound standard, and determining whether the interpreted bit stream is interpreted successfully, so as to determine whether the input sound signal contains a digital component corresponding to the digital sound standard; and
    determining whether the input sound signal matches one of a plurality of known sound standards based on whether the input sound signal contains the FM analog component corresponding to the first frequency and whether the input sound contains the digital component corresponding to the digital sound standard.

2. The method according to claim 1, wherein after the step of determining whether the input sound signal matches one of a plurality of known sound standards, the method further comprises:
    filter the input sound signal to obtain a third filtered signal corresponding to a third frequency;
    frequency-demodulate the third filtered signal to obtain a third demodulated filtered signal, and determine whether the input sound signal contains a FM analog component corresponding to the third frequency according to the phase change of the third demodulated filtered signal; and determine whether the input sound signal matches one of the known sound standards based on whether the input sound signal contains the FM analog components corresponding to the third frequency and the first frequency, and whether the input sound signal contains the digital component corresponding to the digital sound standard.

3. The method according to claim 1, wherein in the step of determining whether the input sound signal contains the FM (frequency modulation) analog component corresponding to the first frequency, if the number of times that the phase change of the first filtered signal is over a default range is less than a threshold, then the input sound signal contains the FM analog component corresponding to the first frequency.

4. The method according to claim 1, wherein in the step of determining whether the interpreted bit stream is interpreted successfully, whether the interpreted bit stream is interpreted into a plurality of frames corresponding to the digital sound standard is determined so as to determine whether the interpreted bit stream is interpreted successfully.

5. The method according to claim 1, wherein the step of decoding and interpreting comprises:
   bit-synchronize the second filtered signal to obtain a second synchronized filtered signal; and
   decode the second synchronized filtered signal according to the digital sound standard to obtain the bit stream, and interpret the bit stream according to the digital sound standard.

6. The method according to claim 5, wherein the bit synchronization is a symbol timing recovery.

7. The method according to claim 1, wherein the digital sound standard is the near instantaneous companded audio multiplex (NICAM).

8. An apparatus for determining a sound standard for an input sound signal, comprising:
   a filter, for filtering the input sound signal to obtain a first filtered signal corresponding to a first frequency and a second filtered signal corresponding to a second frequency;
   a frequency-demodulator, for demodulating the first filtered signal to obtain a first demodulated filtered signal, and determining whether the input sound signal contains a FM analog component corresponding to the first frequency according to the phase change of the first demodulated filtered signal;
   a decoder, for decoding the second filtered signal according to a digital sound standard to obtain a bit stream;
   a interpreting unit for interpreting the bit stream according to the digital sound standard, and determining whether the interpreted bit stream is interpreted successfully, so as to determine whether the input sound signal contains a digital component corresponding to the digital sound standard; and a sound standard determining unit, for determining whether the input sound signal matches one of a plurality of known sound standards according to the results determined by the frequency-demodulator and the interpreting unit.

9. The apparatus according to claim 8, wherein the filter filters the input sound signal to obtain a third filtered signal corresponding to a third frequency;
   wherein the frequency-demodulator frequency-demodulates the third filtered signal to obtain a third demodulated filtered signal, and determines whether the input sound signal contains the FM analog component corresponding to the third frequency according to the phase change of the third demodulated filtered signal;
   wherein the sound standard determining unit determines whether the input sound signal matches one of a plurality of known sound standards according to the results determined by the frequency-demodulator and the interpreting unit.

10. The apparatus according to claim 8, wherein the frequency-demodulator determines whether the number of times that the phase change of the first filtered signal is over a default range is less than a threshold, if it is true, the frequency-demodulator decides the input sound signal contains the FM analog component corresponding to the first frequency.

11. The apparatus according to claim 8, wherein the interpreting unit determines whether the interpreted bit stream is interpreted into a plurality of frames corresponding to the digital sound standard, so as to determine whether the interpreted bit stream is interpreted successfully.

12. The apparatus according to claim 8, wherein the decoder comprises:
   a bit synchronizer, for bit-synchronizing the second filtered signal to obtain a second synchronized filtered signal; and
   a decoding unit, for decoding the second synchronized filtered signal according to the digital sound standard to obtain the bit stream.

13. The apparatus according to claim 12, wherein the bit synchronization is symbol timing recovery.

14. The apparatus according to claim 8, further comprising:
   an analog digital converter, for analog-digital converting a radio frequency signal into a converted sound signal; and
   a decimator, for sampling the converted sound signal to obtain the input sound signal.

15. The apparatus according to claim 8, wherein the digital sound standard is the near instantaneous companded audio multiplex (NICAM).

* * * * *